United States Patent
Ryan et al.

(10) Patent No.: US 7,152,103 B1
(45) Date of Patent: Dec. 19, 2006

(54) LAWFUL COMMUNICATION INTERCEPTION—INTERCEPTING COMMUNICATION ASSOCIATED INFORMATION

(75) Inventors: Ronald D. Ryan, Coppell, TX (US); Fereidoun Homayoun, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 775 days.

(21) Appl. No.: 09/757,904

(22) Filed: Jan. 10, 2001

(51) Int. Cl.
*G06F 15/173* (2006.01)
*G06F 15/16* (2006.01)

(52) U.S. Cl. .................. 709/224; 709/236; 709/230

(58) Field of Classification Search .......... 709/201, 709/202, 224, 230, 236
See application file for complete search history.

(56) References Cited

U.S. PATENT DOCUMENTS

| | | | |
|---|---|---|---|
| 5,852,665 A * | 12/1998 | Gressel et al. ............. 380/30 |
| 5,862,335 A * | 1/1999 | Welch et al. ............. 709/224 |
| 5,923,744 A * | 7/1999 | Cheng ................. 379/221.09 |
| 6,073,013 A * | 6/2000 | Agre et al. ............. 455/428 |
| 6,122,499 A * | 9/2000 | Magnusson ............. 455/405 |
| 6,131,032 A * | 10/2000 | Patel ..................... 455/445 |
| 6,141,548 A * | 10/2000 | Blanchard et al. ....... 455/428 |
| 6,219,786 B1 * | 4/2001 | Cunningham et al. ..... 713/152 |
| 6,229,887 B1 * | 5/2001 | Albers et al. ............ 379/219 |
| 6,363,525 B1 * | 3/2002 | Dougherty et al. ......... 725/34 |
| 6,405,030 B1 * | 6/2002 | Suprunov ............. 455/410 |
| 6,424,701 B1 * | 7/2002 | Maillet et al. ........... 379/35 |
| 6,449,474 B1 * | 9/2002 | Mukherjee et al. ..... 455/414.2 |
| 6,469,983 B1 * | 10/2002 | Narayana et al. ....... 370/231 |
| 6,470,075 B1 * | 10/2002 | Prieur .................... 379/38 |
| 6,496,483 B1 * | 12/2002 | Kung et al. ............ 370/252 |
| 6,501,752 B1 * | 12/2002 | Kung et al. ............ 370/352 |
| 6,553,025 B1 * | 4/2003 | Kung et al. ............ 370/352 |
| 6,563,797 B1 * | 5/2003 | Kung et al. ............ 370/252 |
| 6,577,865 B1 * | 6/2003 | Dikmen et al. ........... 455/433 |
| 6,640,248 B1 * | 10/2003 | Jorgensen .............. 709/226 |
| 6,654,589 B1 * | 11/2003 | Haumont ............. 455/67.11 |
| 6,697,379 B1 * | 2/2004 | Jacquet et al. ........... 370/469 |
| 6,711,689 B1 * | 3/2004 | Lumme et al. ........... 713/201 |
| 6,738,902 B1 * | 5/2004 | Ruppert et al. ........... 713/162 |
| 6,823,185 B1 * | 11/2004 | Comer et al. ............ 455/427 |
| 7,006,508 B1 * | 2/2006 | Bondy et al. ............ 370/410 |
| 2001/0052081 A1 * | 12/2001 | McKibben et al. ....... 713/201 |
| 2002/0049913 A1 * | 4/2002 | Lumme et al. ........... 713/201 |
| 2002/0078384 A1 * | 6/2002 | Hippeläinen ............ 713/201 |
| 2002/0150096 A1 * | 10/2002 | Sjoblom ................ 370/389 |
| 2003/0078041 A1 * | 4/2003 | Dikmen et al. ........... 455/433 |
| 2003/0108182 A1 * | 6/2003 | Dikmen .................. 379/229 |
| 2003/0179747 A1 * | 9/2003 | Pyke et al. ............. 370/389 |

OTHER PUBLICATIONS

Ronald, Ryan, D. et al., System and Method for Reporting Communication Related Information in a Packet Mode Communication, U.S. Appl. No. 09/697,822, filed Oct. 26, 2000.

\* cited by examiner

*Primary Examiner*—Rupal Dharia
*Assistant Examiner*—Kristie D. Shingles
(74) *Attorney, Agent, or Firm*—Carr LLP

(57) ABSTRACT

A method and apparatus are provided for extracting and reporting communication associated information of communications between a subject and an associate. This is achieved by populating an application identifier in the Network Layer 3, which the access networks examine in order to route the packets appropriately, and, thereby, allowing the access networks to isolate and extract the communication associated information. The access networks extract the call associated information and report the same to the Law Enforcement Agencies. Delivery to the LEAs of communication associated information may also be optimized.

19 Claims, 4 Drawing Sheets

LAWFUL COMMUNICATION INTERCEPTION—INTERCEPTING COMMUNICATION ASSOCIATED INFORMATION

TECHNICAL FIELD

The invention relates generally to providing Law Enforcement Agencies (LEAS) with communication associated information (CAI), and, more particularly, to providing an efficient method and apparatus for extracting CAI for use by LEAs.

BACKGROUND

LEAs are allowed to partake in communications surveillance between a subject and an associate in an attempt to obtain further evidence of criminal activity. The evidence that the LEAs have historically been allowed to capture generally comprises call identifying information and call content of voice calls. Call identifying information generally comprises the calling party number and the called party number. Court orders allowing access to the call identifying information generally comprise a Trap-and-Trace order and a Pen Register order, and generally require only a suspicion of wrongdoing. Trap-and-Trace orders allow LEAs access to call identifying information for incoming calls placed to a specified device identified by a phone number, and Pen Register orders allow LEAs access to call identifying information for outgoing calls originating from a specified device or phone number.

Call content generally comprises the content of the call, such as the voice transmissions. Call content orders, commonly known as Title III orders, generally require proof that the subject of the order is engaging in, or there is a high likelihood that the subject of the order is about to engage in, illegal activity. It is estimated that about 10% of the orders are Title III orders, the remaining 90% comprising Trap-and-Trace orders and Pen Register orders.

The technological advances in the area of telecommunications, such as packet-switched networks, however, have provided additional methods and types of communication that render call identifying information less meaningful and difficult to obtain. As a result, the concept of a call, which typically refers to a voice call, is generally replaced with the concept of a communication, which encompasses additional types of communications such as e-mail, Voice over Internet Protocol (VoIP), on-line banking, video, data of various types, and the like.

Communications generally comprise communication associated information (CAI) and communication content. CAI generally comprises communication identifying information, such as Internet Protocol (IP) addresses and session identifiers, call identifying information, call redirection commands, e-mail addresses, and the like. Communication content comprises the information exchanged between the subject and the associate, such as voice transmissions, text messages, credit card numbers, bank accounts, and the like.

Furthermore, in a packet-switched network, such as the Internet, a single message is generally broken into many packets, each packet containing routing information. The packets are sent through an access network, such as the Public Switched Telephone Network (PSTN), and re-assembled at the termination point. Since packet-switched communications are broken into many packets, an access network performing Trap-and-Trace and/or Pen Register orders would typically capture and report information for each packet, yielding voluminous CAI records for each communication sent and/or received by a subject.

The packets are generally organized according to the Open Standards Interconnect (OSI) seven-layer protocol model. The access networks generally route the packets of communication by evaluating the Network Layer 3, with the Layers 4–7, which typically contain the CAI and the communication content, remaining unevaluated by the access networks. The Network Layer 3 of each packet generally comprises the routing information, which can also be considered CAI, such as the IP addresses of the source and destination network components for the packets. Therefore, communications sent or received via a service provider, such as America Online, generally comprise the IP addresses of the service provider and the subject. For some applications, the identifying information of the other party, i.e., the associate, is provided in the Application Layer 7.

For instance, e-mail service providers generally use the Application Layer 7 to communicate the addressee of an e-mail. When a subject sends an e-mail to an associate, the Network Layer 3 source and destination IP addresses comprise the IP addresses of the subject and the e-mail Service Provider. The e-mail address of the associate is generally placed in the Application Layer 7 by the e-mail application and, therefore, is generally not available to the access networks since the access networks evaluate the Network Layer 3. Moreover, for the access networks to evaluate the additional layers, there is a need for an indication of the application type allowing the access networks to isolate and send the CAI to the LEAs for Trap and Trace and Pen Register court orders.

Prior attempts at providing the necessary information have used applications that search packets for the necessary information, commonly referred to as "sniffers". Sniffers typically provide LEAs access to the entire communication. The LEAs then evaluate and remove the allowed material, such as the CAI. Access by LEAs to the entire communication, however, violates the privacy of the individual absent a Title III content order.

Therefore, for these and other reasons, there is a need for a method allowing the access networks to isolate and extract CAI of packet-based communications. Additionally, there is a need to provide CAI information obtained in a packet-based network in a condensed format.

SUMMARY

The present invention provides a method and apparatus for providing LEAs with CAI for subjects of Trap-and-Trace and/or Pen Register surveillance orders. The method and apparatus comprises populating the Network Layer 3 with an Application Identifier (AID), which the access networks use to isolate and extract CAI from the packet.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The principles of the present invention and their advantages are best understood by referring to the illustrated embodiment depicted in FIGS. 1–4.

Figure 1:
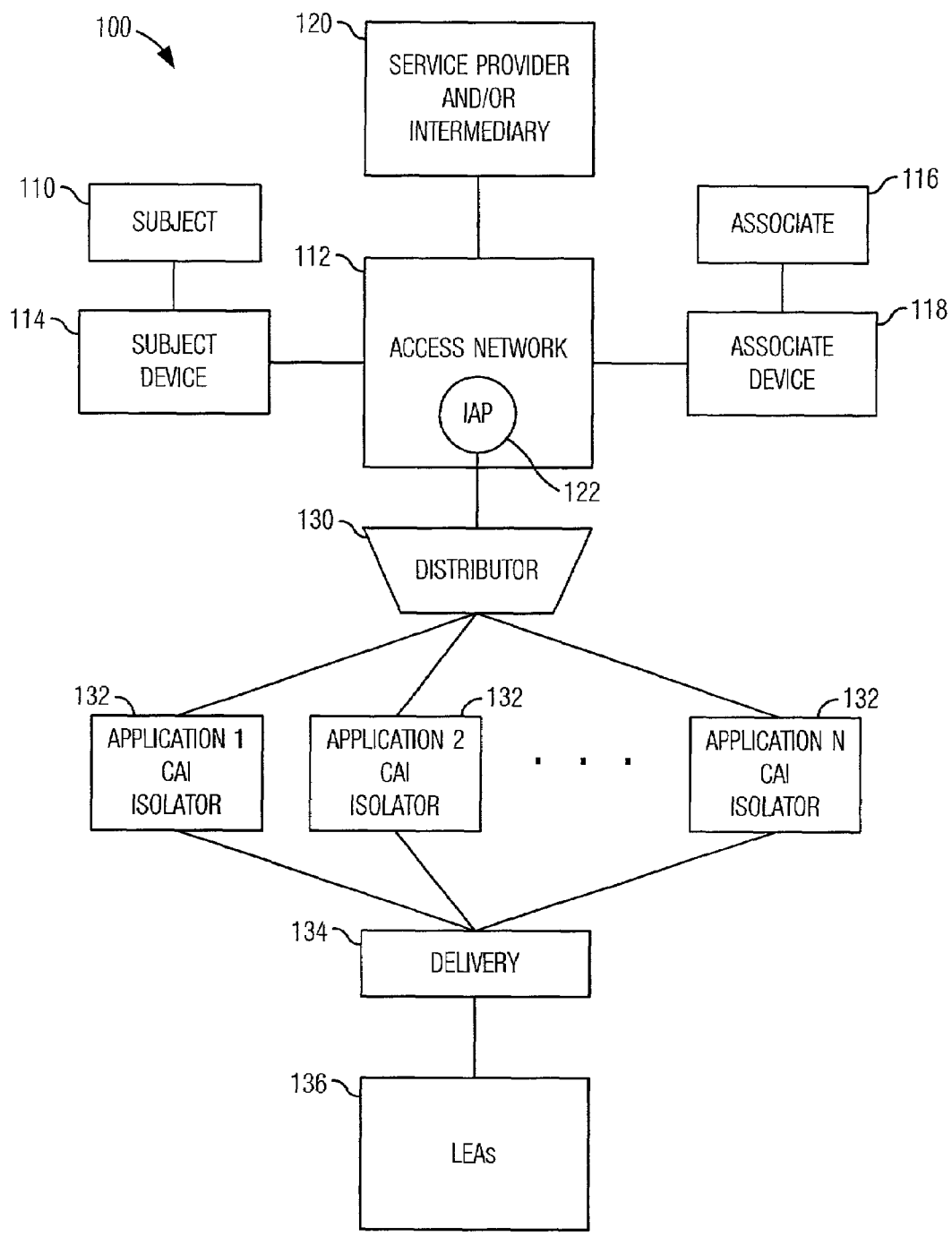
FIG. 1 schematically depicts the typical network environment that embodies the present invention.

Referring to FIG. 1 of the drawings, the reference numeral 100 generally designates a communication system that embodies features of the present invention. The subject of the surveillance order 110 is connected to the access network 112 via a subject device 114, such as wireline phone, wireless phone, laptop computer, desktop computer, Personal Data Assistant (PDA), and the like. The access network 112, such as the Public Switched Telephone Network (PSTN), a wireless communications network, the Internet, and the like, provides communications services between the subject 110 and the associate 116. The associate 116 accesses the communications via an associate device 118, such as a wireline phone, wireless phone, laptop computer, desktop computer, PDA, and the like. Moreover, a service provider and/or intermediary 120, such as America On-Line, Microsoft Network, and the like, generally provides communication services, such as e-mail, Voice-Over-IP (VoIP), video conferencing, banking, and the like. The details of the subject device 114, the associate device 118, the access network 112, and the service provider 120 are well-known to a person of ordinary skill in the art and, therefore, will not be discussed in further detail. Furthermore, while only a single service provider 120 and associate 116 is shown, it is well-known to a person of ordinary skill in the art that each of these may be comprised of one or more and that the techniques disclosed in the present application are equally applicable to each.

Communications from the subject 110 to the associate 116 typically involve information packets sent from the subject 110 to the service provider 120 via the access network 112. The service provider 120 then forwards the communication to the associate 116 via the access network 112. The access network 112 comprises an Intercept Access Point (IAP) 122 for the interception of the CAI and the call content for communications to and/or from the subject 110. The process of intercepting communications to and/or from a subject is well-known in the art and, therefore, will not be discussed in further detail.

Figure 2:
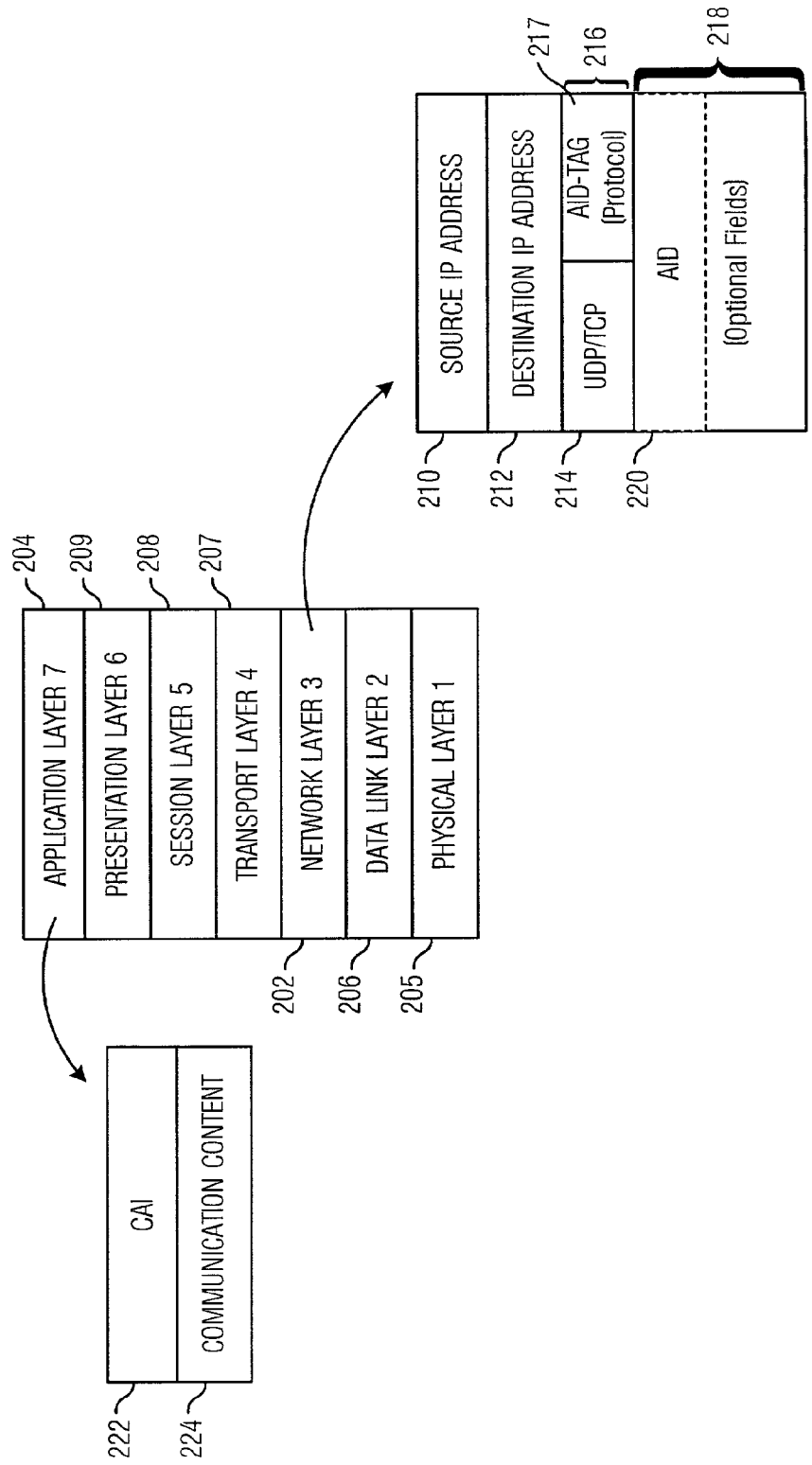
FIG. 2 is a message format illustrating one embodiment in which the Network Layer 3 is populated with an application identifier tag (AID-tag) and an application identifier (AID)

Since the access network 112 and the IAP 122 are generally responsible for evaluating only the Network Layer 3, the preferred embodiment of the present invention inserts additional information into the Network Layer 3, allowing for the isolation and extraction of the CAI, as illustrated by the protocol stack in FIG. 2. Generally, the protocol stack comprises the Network Layer 3 202 and the Application Layer 7 204. The remaining layers, the Physical Layer 1 205, the Data Link Layer 2 206, the Transport Layer 4 207, the Session Layer 5 208, and the Presentation Layer 6 209 are shown for completeness and are well known to one of ordinary skill in the art and, therefore, will not be discussed in greater detail.

The Network Layer 3 202 generally comprises a source IP address 210, a destination IP address 212, the User Datagram/Transmission Control Protocol field 214, a protocol field 216, and optional data fields 218. Preferably, the protocol field 216 comprises an application identifier tag (AID-tag) 217, such as a code of 99, that indicates an optional data field 218 is present comprising an application identifier (AID) 220. The AID 220 preferably comprises a unique identifier for a vendor and/or application, such as Microsoft Outlook, Netscape Mail, and the like. Given the AID 220, the format of the CAI 222 included in the Application Layer 7 is known to the access network, and the CAI 222 can be extracted and reported to the LEAs in a meaningful format.

In operation, a known AID-tag 217, such as 99, indicates that the packet includes an optional field, which includes an AID 220 that indicates the packet was sent by a specific vendor and/or application. Since the vendor and/or application is known, the format of the CAI included in the Application Layer 7 is known, and the CAI may be extracted and reported to the LEAs.

The values and the meanings of the protocol field 216 are generally governed by a standards organization, such as the Internet Engineering Task Force (IETF). Therefore, for every value the LEAs request to be assigned to the protocol field 216, the LEAs must work with the IETF and members of the industry to have the value assigned. Additionally, the protocol field 216 is typically limited to an 8-bit field, limiting the number of values available to the LEAs and hence the number of vendor/application pairs that may be identified.

The optional field 218, however, neither requires the interaction with the standards organizations nor is it subject to the 8-bit size limitation. Therefore, by placing the AID 220 in the optional field 218, the AID 220 can be assigned a greater range of values without the need of approval from a standards. The LEAs and the members of the industry only require one value to be assigned for the AID-tag 217 in the protocol field 216.

Figure 3:
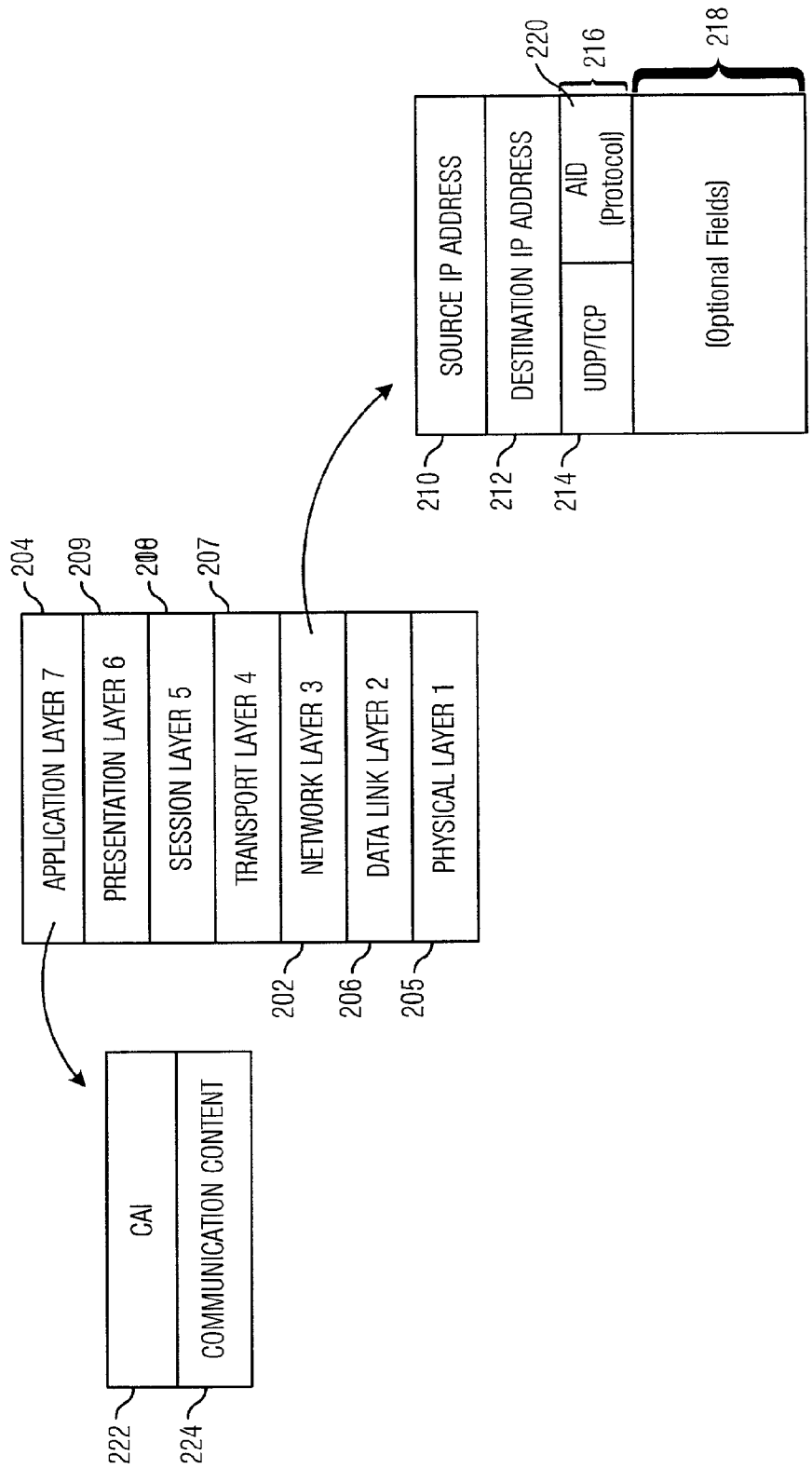
FIG. 3 is a message format illustrating another embodiment in which the Network Layer 3 is populated with an AID.

Alternatively, the protocol stack comprises a structure as illustrated in FIG. 3. In this instance, the protocol field 216 comprises an AID 220 indicating a vendor and/or an application, such as the Microsoft Outlook e-mail application. While this embodiment is subject to the size and allocation limitations discussed above, this embodiment presents significant advantages over the prior art by allowing the access networks to isolate, extract, and report the CAI.

Referring back to FIG. 1, the IAP intercepts communications to and/or from the subject 110 and routes the packets to a distributor 130. The distributor 130 routes the packet to an Application CAI Isolator 132 corresponding to the AID 220 extracted above. The Application CAI Isolator 132 parses the Application Layer 7 204, extracting the CAI 222. The CAI 222 is then sent to a delivery function 134 that consolidates and delivers the CAI 222 to the appropriate LEA 136.

In operation, the IAP 122 intercepts packets sent to and/or from the subject 110 containing an AID-tag 217 and/or an AID 220 that indicates the packet contains CAI 222. The distributor 130 evaluates the AID 220 and routes the packet to the appropriate Application CAI Isolator 132. The Application CAI Isolator identifies the format of the Application Layer 7 204 and extracts the CAI 222. The CAI 222 is extracted and sent to the delivery function 134 for consolidation and reporting to the LEAs.

Figure 4:
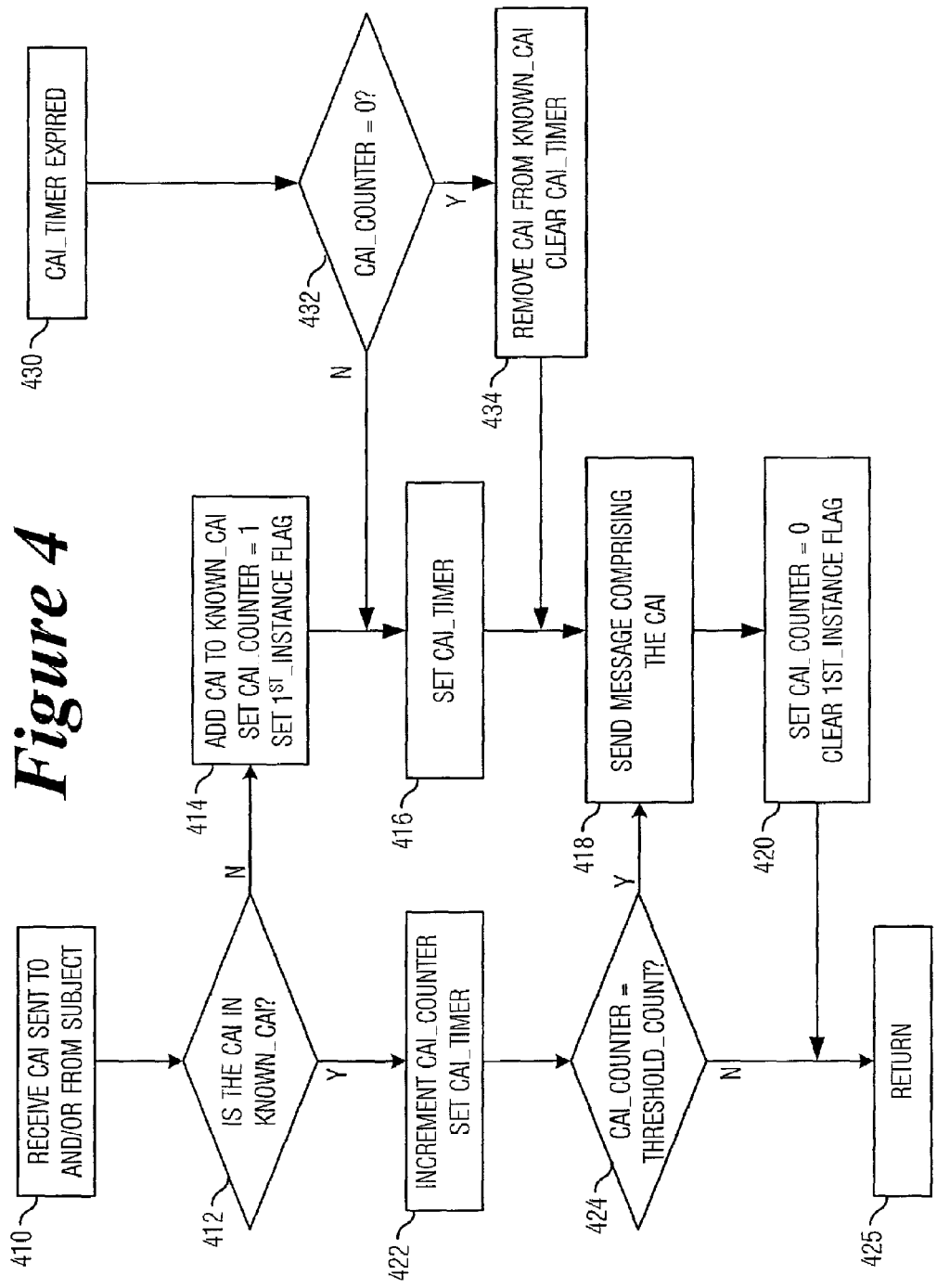
FIG. 4 is a flow chart illustrating one embodiment of consolidating and reporting CAI to the LEAs.

The process of delivering and consolidating is further illustrated in FIG. 4. In step 410, the CAI 222 that was either sent to and/or by the subject is received by the delivery function 134. The delivery function 134 first determines whether the CAI 222 is a known CAI, i.e. a first instance of the CAI, as in step 412. A list of active CAI is maintained in a list KNOWN_CAI. As CAI is received, the CAI is compared to the list KNOWN_CAI. If the CAI is not in KNOWN_CAI, the CAI is preferably treated as a new instance of a CAI of the communication between the subject and the associate. If the CAI is in KNOWN_CAI, however, the CAI is preferably treated as a CAI of an ongoing communication. Moreover, for each instance of CAI, a CAI_COUNTER and a $1^{st}$_INSTANCE_FLAG is maintained. The CAI_COUNTER indicates the number of packets identified by the CAI that have been sent and/or received by the subject. The $1^{st}$_INSTANCE_FLAG indicates whether the CAI is a new instance of a CAI.

If the CAI received is a new instance of a CAI, the CAI is added to the list KNOWN_CAI, a CAI_COUNTER is initialized, and a $1^{st}$_INSTANCE_FLAG is set, as in step 414. Thereafter, in step 416 the CAI_TIMER is set to initialize a timeout counter, such as two minutes and the like, in step 418 a message comprising the CAI is sent to the LEAs with the $1^{st}$_INSTANCE_FLAG set and the CAI_COUNTER, and in step 420 the $1^{st}$_INSTANCE_FLAG is cleared and the CAI_COUNTER is reset.

The message preferably comprises a subject identifier, a time stamp indicating when the message was sent and/or received, the IP address of the subject 110, a packet direction indicator identifying whether the message was sent or received by the subject 110, the IP address of the associate, a first instance indicator identifying the new instance of a CAI, and a CAI counter indicating the number of packets identified by the CAI seen since the last report. As the law develops and allows the LEAs access to additional information, additional fields may be extracted from the CAI and reported to the LEAs.

If the packet received is not a new instance of a CAI in step 412, the CAI_COUNTER is incremented and the CAI_TIMER is set to indicate the receipt of an additional packet identified by the CAI, as in step 422. This process of counting the number of packets identified by the CAI received without sending a message to the LEAs will continue until the CAI_COUNTER is equal to an adjustable THRESHOLD_COUNT, as in step 424. When the CAI_COUNTER equals the THRESHOLD_COUNT, the message will be sent and the CAI_COUNTER will be reset as in steps 418 and 420. Otherwise, no message will be sent, as indicated by step 424. Thereafter, the delivery function awaits the receipt of CAI or the expiration of the CAI_TIMER, as in step 425.

Additionally, processing will occur when the CAI_TIMER expires, as indicated in step 430. When the timer expires, the delivery function 134 determines whether the CAI_COUNTER is equal to zero, indicating that a packet identified by the CAI has not been received in a predetermined amount of time and the number of packets identified by the CAI received has yet to be sent. In this case, the CAI_TIMER is set, as in step 416, a message is sent with the current CAI_COUNTER, as in step 418, and the CAI_COUNTER is reset to zero, as in step 420.

Since the CAI_TIMER has been set in step 416, the timer will expire and the delivery function 134 will begin processing again at step 430 if no additional CAI are received. This time, however, the CAI_COUNTER will equal zero in step 432. As a result, the CAI_TIMER will be cleared in step 434 and a CAI message with a CAI_COUNTER of zero will be sent. Thereafter, the delivery function 134 awaits the arrival of CAI, as in step 425.

It is understood that the present invention can take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method of capturing communication associated information (CAI) of a communication between a subject and an associate, the method comprising the steps of:
   intercepting the communication, the communication comprising at least one packet and each packet comprising CAI;
   providing an application identifier (AID) in the at least one packet of the communication, the AID identifying the format of the CAI, wherein the AID is located in an optional field of Network Layer 3;
   extracting in accordance with the AID the CAI from the at least one packet for reporting;
   determining whether the extracted CAI is a new instance of the CAI;
   reporting a first message to a Law Enforcement Agency (LEA) in response to a determination that the extracted CAI is the new instance of the CAI;
   determining whether a predetermined amount of time has elapsed between packets of the at least one packet of the communication, the packets being identified by the CAI; and
   reporting a second message to an LEA in response to a determination that the given amount of time has elapsed, wherein the second message represents a timeout indication.

2. The method of claim 1, wherein the second message comprises at least one of a subject identifier, a time stamp indicating when the message was sent, the IP address of the subject, a packet direction indicator identifying whether the message was sent or received by the subject, the IP address of the associate, a first instance indicator identifying the new instance of the CAI, and a counter indicating the number of packets identified by the CAI seen since a last message.

3. The method of claim 1, wherein the method further comprises the steps of:
   determining whether a given number of packets of the at least one packet of the communication has been intercepted, the packets being identified by the CAI; and
   reporting a third message in response to a determination that the given number of packets identified by the CAI has been intercepted.

4. The method of claim 3, wherein the third message comprises at least one of a subject identifier, a time stamp indicating when the message was sent, the IP address of the subject, a packet direction indicator identifying whether the message was sent or received by the subject, the IP address of the associate, a first instance indicator identifying the new instance of the CAI, and a counter indicating the number of packets identified by the CAI seen since a last message.

5. The method of claim 1, wherein the method further comprises the step of:
   providing an AID-tag in the at least one packet of the communication, the AID-tag indicating the presence of the AID.

6. The method of claim 1, wherein the method further comprises the steps of:

providing an AID-tag in the at least one packet of the communication, wherein the AID-tag indicates the presence of the AID, and wherein the AID-tag is located in the protocol field of the Network Layer 3.

7. The method of claim 1, wherein the first message comprises at least one of a subject identifier, a time stamp indicating when the message was sent, the IP address of the subject, a packet direction indicator identifying whether the message was sent or received by the subject, the IP address of the associate, a first instance indicator identifying the new instance of the CAI, and a counter indicating the number of packets identified by the CAI seen since a last message.

8. A method of consolidating at least one packet of a communication between a subject and an associate, the method comprising the steps of:

receiving at least one packet of the communication, each packet comprising communication associated information (CAI);

providing an application identifier (AID) in the at least one packet of the communication, the AID identifying the format of the CAI, wherein the AID is located in an optional field of Network Layer 3;

extracting in accordance with the AID the CAI from the at least one packet for reporting;

determining whether a packet is a new instance of the CAI reporting the CAI in response to a determination that the packet is a new instance of the CAI to an LEA;

determining whether a predetermined amount of time has elapsed between packets of the at least one packet;

reporting a timeout indication to an LEA in response to a determination that the predetermined amount of time has elapsed; and reporting the CAI periodically to an LEA in response to a determination that the packet is a subsequent packet.

9. The method of claim 8, wherein the step of determining whether a packet is a new instance of the CAI is performed by comparing the CAI with a previous CAI.

10. The method of claim 8, wherein the step of determining whether a packet is a new instance CAI is performed by allowing a given amount of time to elapse since the receipt of the at least one packet.

11. The method of claim 8, wherein the CAI report comprises at least one of a subject identifier, a time stamp indicating when the message was sent, the IP address of the subject, a packet direction indicator identifying whether the message was sent or received by the subject, an associate identifier, a first instance indicator identifying the new instance of the CAI, and a counter indicating the number of packets identified by the CAI seen since a last report.

12. An apparatus for providing access to communication associated information (CAI) of a communication between a subject and an associate, the apparatus comprising:

means for intercepting the communication, the communication comprising at least one packet and each packet comprising CAI;

means for providing an application identifier (AID) in the at least one packet of the communication, the AID identifying the format of the CAI, wherein the AID is located in an optional field of Network Layer 3;

means for extracting in accordance with the AID the CAI from the at least one packet for reporting;

means for determining whether the extracted CAI is a new instance of the CAI;

means for reporting to an LEA a first message in response to a determination that the extracted CAI is the new instance of the CAI;

means for determining whether a predetermined amount of time has elapsed between packets of the at least one packet of the communication, the packets being identified by the CAI; and means for reporting to an LEA a second message in response to a determination that the given amount of time has elapsed, wherein the second message represents a timeout indication.

13. The apparatus of claim 12, wherein the apparatus further comprises:

means for determining whether a given number of packets of the at least one packet of the communication has been intercepted, the packets being identified by the CAI; and means for reporting an intermediate CAI message in response to a determination that the given number of packets of the at least one packet of the communication has been intercepted.

14. The apparatus of claim 12, wherein the apparatus further comprises:

means providing an AID-tag in the at least one packet of the communication, the AID-tag indicating the presence of the AID.

15. The apparatus of claim 12, wherein the apparatus further comprises:

means for providing an AID-tag in the at least one packet of the communication, wherein the AID-tag indicates the presence of the AID, and wherein the AID-tag is located in the protocol field of the Network Layer 3.

16. An apparatus for consolidating at least one packet of a communication between a subject and an associate, the apparatus comprising:

means for receiving at least one packet of the communication, each packet comprising communication associated information (CAI);

providing an application identifier (AID) in the at least one packet of the communication, the AID identifying the format of the CAI, wherein the AID is located in an optional field of Network Layer 3;

extracting in accordance with the AID the CAI from the at least one packet for reporting;

means for determining whether a packet is a new instance of CAI;

means for reporting to an LEA the CAI in response to a determination that the packet is the new instance of CAI;

means for determining whether a predetermined amount of time has elapsed between packets of the at least one packet;

means for reporting a timeout indication to an LEA in response to a determination that the predetermined amount of time has elapsed; and means for reporting to an LEA the CAI periodically in response to a determination that the packet is a subsequent packet.

17. The apparatus of claim 16, wherein the apparatus further comprises:

means for determining whether a given number of packets of the at least one packet of the communication has been intercepted, the packets being identified by the CAI; and means for reporting an intermediate CAI message in response to a determination that the given number of packets of the at least one packet of the communication has been intercepted.

18. The apparatus of claim 16, wherein the apparatus further comprises:
  means providing an AID-tag in the at least one packet of the communication, the AID-tag indicating the presence of the AID.

19. The apparatus of claim 16, wherein the apparatus further comprises:
  means for providing an AID-tag in the at least one packet of the communication, wherein the AID-tag indicates the presence of the AID, and wherein the AID-tag is located in the protocol field of the Network Layer 3.

* * * * *